April 7, 1925.

W. H. MILLSPAUGH

ANTIFRICTION JOURNAL BEARING

Filed Nov. 1, 1922   2 Sheets-Sheet 1

1,532,430

INVENTOR.
William H. Millspaugh
BY Julian C. Dowell
his ATTORNEY.

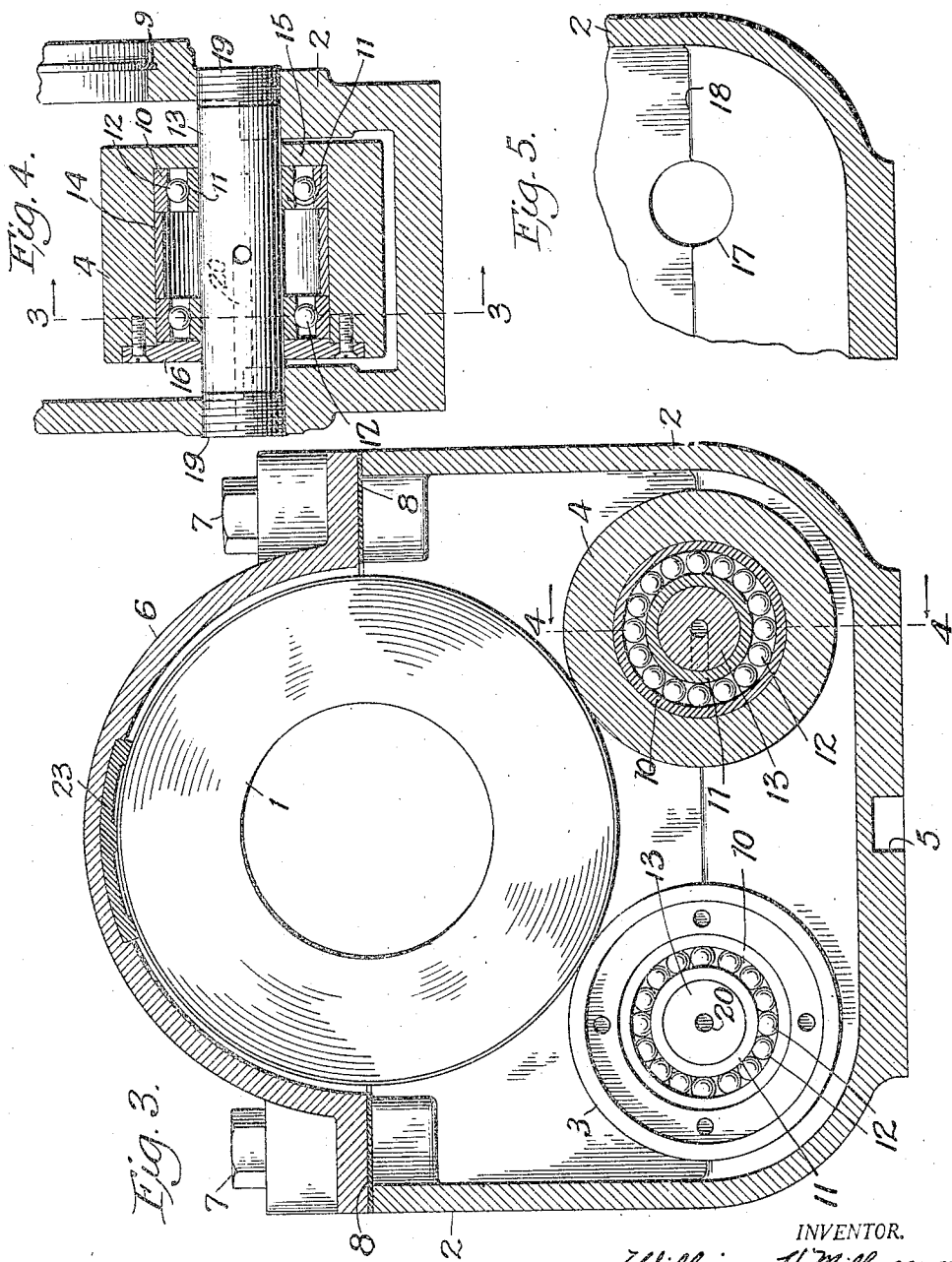

Patented Apr. 7, 1925.

1,532,430

UNITED STATES PATENT OFFICE.

WILLIAM H. MILLSPAUGH, OF SANDUSKY, OHIO.

ANTIFRICTION JOURNAL BEARING.

Application filed November 1, 1922. Serial No. 598,341.

*To all whom it may concern:*

Be it known that I, WILLIAM H. MILLSPAUGH, a citizen of the United States, residing at Sandusky, in the county of Erie and State of Ohio, have invented certain new and useful Improvements in Antifriction Journal Bearings; and I do hereby declare the following to be a full, clear, and exact description of the invention, such as will enable others skilled in the art to which it appertains to make and use the same.

This invention relates to journal bearings, and among other objects is intended to provide an efficient anti-friction bearing suitable for journaling paper mill rolls, drying cylinders, evaporator drums and the like.

Journal bearings for the steam-heated drying cylinders of paper machines, or other analogous equipment, are subjected to heavy service duty and to temperature changes due to introduction of steam or other heating medium into the cylinders or drums, which frequently causes binding of the journals when mounted in plain bearings or in ball or roller bearings concentric with the journals. It is accordingly desired to provide a journal bearing structure which will be capable of carrying heavy loads at high speeds, as well as performing satisfactorily under light load conditions, and which will not be so affected by heat changes as to cause objectionable binding of the journal.

Practicability and simplicity of construction, durability and extreme anti-friction qualities, are further desiderata which have been borne in mind in producing the present invention.

A preferred construction embodying the invention, comprising a self-aligning journal box containing the journal and its bearing mechanism, is illustrated in the accompanying drawings.

The invention will first be described with reference to said drawings and then particularly pointed out in the claims appended to this description.

In said drawings:

Fig. 3 is a view similar to Fig. 1, showing one of the journal bearing members with an end cap removed to reveal an interior bearing therefor, and showing the other bearing member in cross section, said cross section being taken on the line 3—3 of Fig. 4;

Fig. 4 is a vertical section of a portion of the journal box taken through one of the journal supporting members on the line 4—4 of Fig. 3; and Fig. 5 is a detail elevation of a fragment of one of the interior walls of the journal box.

Figures 1, 2:
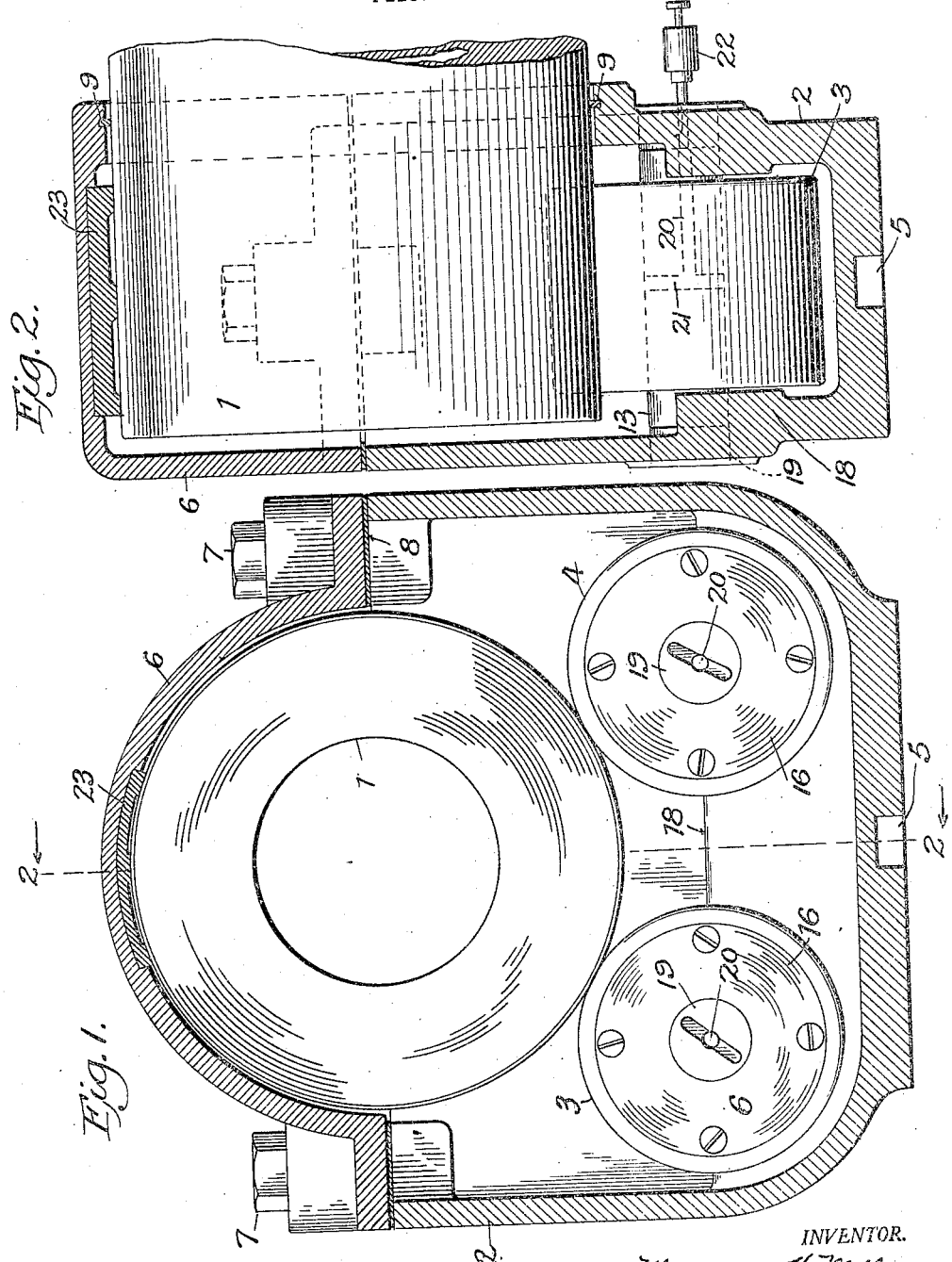
Fig. 1 is a vertical cross section of a journal box containing an embodiment of the invention, the journal and its bearing members being shown in end elevation.
Fig. 2 is a vertical section taken longitudinally of the journal, on the line 2—2 of Fig. 1, showing the journal and one of its bearing members in side elevation.

In the drawings, 1 denotes one of the journals of a revolving member such for example as a steam-heated drying cylinder of a paper making machine.

The journal enters a journal box 2, within which are a pair of heavy and preferably surface-hardened rollers 3 and 4 on which the journal bears, the axes of said rollers being disposed below and at opposite sides of the vertical center of the journal.

The journal box 2 may be mounted on any suitable support, and is preferably so mounted as to be capable of a slight rocking and pivoting so that the bearing assembly may align itself with the journal. For this purpose the base of the journal box may be slightly rounded, and the base may be provided with a socket or recess 5 for pivotally engaging a stud or dowel projecting from the support on which the journal box is mounted.

In the particular form shown, the journal box is constructed with a removable cap or cover 6 of substantially semi-circular form to enclose the upper portion of the journal. Said cap is suitably secured to the journal box proper, as for instance by the use of stud bolts 7 passing through lugs on the cap and screwed into interior lugs in the journal box. Instead of this construction, a journal box constructed to be opened at the side rather than at the top may be used. A gasket 8 is interposed between the journal box proper and its cap to seal the joint between these parts. The opening in the back of the journal box to receive the journal is also provided with a packing ring 9 to exclude the entry of dirt or foreign matter into the journal box.

While the journal 1 is represented as entering only one side of the journal box, it will be understood that in some cases the journal may extend through journal openings in both the front and back sides of the box, as for instance where the journal is provided with an operating gear outside of the box. For example, the journal of the drum or cylinder at the opposite end from that illustrated in the drawings will usually extend clear through its journal box and carry a gear in mesh with the gears of other drying cylinders.

The journal-supporting rollers 3 and 4 are of annular or tubular form, and enclose annular anti-friction bearing devices, comprising concentric hardened race-rings 10 and 11 and interposed balls 12 or other rolling elements; the outer race-rings 10 of said bearings being fitted within the journal-supporting rollers and the inner race rings 11 being mounted and affixed on stationary shafts 13. Thus the journal bears with rolling contact on a pair of load sustaining rollers 3 and 4, which in turn bear and rotate freely on annular series of rolling elements revolving about said fixed shafts 13.

In the specific construction illustrated, two annular ball bearings are provided for each of the journal supporting rollers, as shown in Fig. 4; but it will be understood that one or any desired number of such bearing devices, comprising race rings having races or tracks for either a single or a plurality of rows of balls or other rolling elements may be used.

In the construction shown in Fig. 4, the two ball bearing devices are separated by a spacer 14. One of said ball bearings has its race rings set in the end of the journal-supporting roller against an inwardly projecting flange 15 closing the end of said roller; while the race rings of the other ball bearings are engaged by an annular cap 16 fitted in a counter-sunk recess in the opposite end of the roller and secured by screws or otherwise. Thus the bearings devices of the illustrative construction are housed and concealed and the parts are properly held in desired relative positions. The specific construction may of course be varied in accordance with the number and arrangement of the annular ball or roller bearing devices.

The shafts 13 on which the anti-friction bearings for the journal supporting rollers are mounted, are suitably supported in the journal box, as for instance by seating the ends of said shafts in sockets 17 formed in the ledges or thickened wall portions 18 in the lower part of the journal box; or the shafts may if desired be supported in openings in the journal box walls in addition to the supports provided by the inwardly projecting wall portions 18. In the illustrated construction, the opposite walls of the journal box are provided with preferably interiorly threaded openings in alignment with said shafts 13, and these openings are closed by screw plugs 19. The shafts 13 may be secured against rotation by any suitable means. In the construction illustrated, the screw plugs 19 are screwed against the ends of said shafts to hold them in fixed or non-rotatable position.

To permit introduction of lubricant to the anti-friction bearings contained in the journal-supporting rollers, the shafts 13 may be provided with longitudinal oil ducts or channels 20 and communicating transverse ducts 21. In Fig. 2, a grease cup or oiler 22 is shown having its nipple extended through one of the screw plugs 19 and entered into the longitudinal oil duct in the shaft 13, for forcing oil or other desired lubricant through said shaft and into the recesses in the journal-supporting roller containing the anti-friction bearings.

An insert of babbitt or other packing material 23 may be provided in the top of the journal box cap, fitting a correspondingly shaped recess therein, to prevent "jumping" or unseating of the cylindrical journal from its bearing rollers when the cylinder is subjected to a lifting strain such as is occasionally caused when starting a train of drying cylinders under the impulse of a gear drive.

The construction described provides a highly satisfactory and successful journal bearing, particularly adapted for steam heated drying cylinders, evaporator drums and other similar purposes, as the bearing is capable of safely carrying heavy loads at great speeds, and is not functionally affected by the heat changes to which the journals are subjected in the introduction of steam or other heating medium to the cylinders, since expansion or contraction of the journal incident to temperature conditions merely raises or lowers its center without causing binding; nor is the heat to which the mechanism is exposed destructive of the ball or roller races, which are contained within the load supporting rollers on which the journal bears. The bearing possesses extreme anti-friction qualities, and the structure is simple, practicable and durable. The swivel mounting of the journal box provides a self-aligning bearing structure which, in conjunction with the type of journal bearing described, is particularly advantageous in preventing binding and in providing a reliable construction for the purpose described.

By mounting the journal-supporting rollers on stationary shafts, with the ball bearing devices enclosed within the rollers, as shown for example in the drawings, shafts of such short lengths may be employed as to reduce shaft flexing under the load to a minimum; and such flexing as may occur will be substantially immaterial, since it has no other effect than the mere bending of a stationary shaft and consequently no tendency to set up crystallization such as would accompany the flexing of a rotating load-sustaining shaft.

Obviously the present invention is not restricted to the specific details of construction and arrangement shown in the drawings, since such details may be variously modified to suit different requirements and conditions to which structures embodying the invention may be applied.

Having thus described my invention, what I claim as new and desire to secure by Letters Patent of the United States is:

1. A structure of the class described comprising in combination, a large journal of a cylinder or member subject to heat influence adapted to expand the journal; a pair of rollers of comparatively large diameter affording a supporting bearing for said journal; anti-friction bearings for said large rollers housed therein, comprising concentric race rings and interposed rolling elements, the outer race rings being secured within said rollers; said rollers being concentrically recessed to receive said anti-friction bearings and having thick annular walls enclosing the said outer race rings; fixed shafts for said rollers on which the inner race rings of the respective anti-friction bearings are respectively mounted; and means providing supports for said shafts adjacent the faces of said rollers; whereby the heavy journal bears on comparatively large rollers which are freely revoluble on annular series of rolling elements about said shafts, and any flexure or bending of said shafts under load merely affects the centers of said anti-friction bearings without imposing a tendency to set up crystallizing of the shafts; while the construction as a whole is such that any expansion of the journal will merely raise its center without affecting the anti-friction capacity of the bearing, and the rolling elements of the anti-friction bearings are substantially removed from contact with the heated journal by the thick annular walls of the large rollers and the outer race rings fitted therein.

2. A structure of the class described comprising, in combination, a pair of rollers of comparatively large diameter affording a supporting bearing for a large cylinder journal; a rocking supporting structure carrying said large rollers; anti-friction bearings for said large rollers housed therein, comprising concentric race rings and interposed rolling elements, the outer race rings being secured within said rollers; said rollers being concentrically recessed to receive said anti-friction bearings and having thick annular walls enclosing the said outer race rings; shafts for said rollers on which the inner race rings of the respective anti-friction bearings are respectively mounted; said rocking supporting structure providing substantial seats for said shafts near the anti-friction bearings; whereby the journal bears on comparatively large rollers which are freely revoluble on annular series of rolling elements about said shafts, and any flexure or bending of said shafts under load merely affects the centers of said anti-friction bearings without imposing a tendency to set up shaft crystallizing, while the construction as a whole provides a self-aligning non-binding supporting bearing for the large journal.

3. A structure of the class described comprising, in combination, a pair of rollers of large diameter and comparatively short length affording a supporting bearing for a large cylinder journal; short shafts for said rollers; anti-friction bearings for said rollers housed therein and mounted on said shafts; and means providing substantial supporting seats for said shafts immediately adjacent the end faces of said large rollers; said shafts being non-rotatable; whereby shaft flexure under load is reduced by the short shaft length between its supports, while such flexing of the fixed shafts as occurs only affects the centers of the anti-friction bearings without imposing a tendency to set up shaft crystallization.

4. A structure of the class described comprising, in combination, a pair of rollers of large diameter affording a supporting bearing for a cylinder journal; fixed shafts for said rollers; anti-friction bearings for said rollers housed therein and mounted on said shafts; said rollers being concentrically recessed to receive said bearings and having thick annular walls enclosing said bearings; there being a pair of said bearings spaced apart in each roller and arranged near the ends thereof; and means providing substantial supporting seats for said shafts immediately adjacent the end faces of said rollers; whereby the load on the shaft is applied near its supports, tending to minimize shaft flexure, while such flexing of the fixed shafts as occurs merely affects the centers of the anti-friction bearings without imposing a tendency to set up crystallization of the said shafts.

5. A structure of the class described comprising, in combination, a pair of rollers of large diameter affording a supporting bearing for a large cylinder journal; shafts for said rollers; anti-friction bearings interposed between said shafts and rollers; and a centrally-swiveled rocking supporting structure having side walls enclosing said rollers and carrying said shafts; whereby the journal bearing as a whole is self-alignable with the journal without affecting the anti-friction capacity of the bearing.

6. A structure of the class described comprising, in combination, a pair of rollers of large diameter affording a supporting bearing for a large cylinder journal; shafts for said rollers; anti-friction bearings interposed between said shafts and rollers; a centrally-swiveled rocking support having side walls enclosing said rollers and carrying said shafts; and means associated with said support providing a housing for the journal and journal bearings.

7. A structure of the class described comprising, in combination, a drying cylinder having journals subject to heat changes adapted to cause expansion of the journals; non-binding bearings therefor comprising comparatively large journal supporting rollers; anti-friction bearings for said rollers contained in said rollers; short shafts for said bearings; journal boxes enclosing the respective journals and their journal supporting rollers; said journal boxes being rockingly mounted for self-aligning the bearings with the cylinder.

8. A journal bearing structure comprising, in combination, a journal-box; a journal entering the journal box; shafts in said journal-box below and at opposite sides of the vertical center of the journal; supports for said shafts in the opposite journal-box walls; said walls having openings aligned with said shafts; plugs closing said openings and engaging said shafts to prevent rotation thereof and annular anti-friction bearing devices mounted on said shafts; and annular or tubular journal-supporting rollers containing and bearing on said devices.

9. A journal bearing structure comprising, in combination, a journal-box; a journal-supporting rollers in said box; shafts on which said rollers are mounted; shaft supports on opposite walls of the journal-box; annular anti-friction bearing devices interposed between said shafts and rollers; and screw plugs in opposite walls of the box engaging the ends of said shafts to secure the same in non-rotatable condition.

10. In a journal bearing of the character described, journal-supporting rollers; shafts on which said rollers are mounted; annular roller bearings interposed between said shafts and journal-supporting rollers; said rollers constructed to enclose said bearings; and oil passages in said shafts communicating with the interior of the rollers for supplying lubricant to said bearings; and a journal box enclosing said rollers and constructed to permit introduction of lubricant into said oil passages.

In testimony whereof I affix my signature in the presence of two witnesses.

WILLIAM H. MILLSPAUGH.

Witnesses:
M. A. SMITH,
C. L. MILLKE.